United States Patent [19]

Bobsein et al.

[11] Patent Number: 4,774,276

[45] Date of Patent: Sep. 27, 1988

[54] MELT STABILIZATION OF POLY(ARYLENE SULFIDE SULFONE)S

[75] Inventors: Rex L. Bobsein; Harold D. Yelton; Mark W. Woods; Merlin R. Lindstrom, all of Bartlesville, Okla.

[73] Assignee: Phillips Petroleum Company, Bartlesville, Okla.

[21] Appl. No.: 20,069

[22] Filed: Feb. 27, 1987

[51] Int. Cl.$^4$ .......................... C08K 3/08; C08K 3/10; C08K 3/22; C08K 3/24; C08K 5/09

[52] U.S. Cl. ..................... 524/399; 524/397; 524/432; 524/434; 524/439; 528/388

[58] Field of Search .................. 528/388; 525/537; 524/397, 399, 432, 434, 439

[56] References Cited

U.S. PATENT DOCUMENTS

| | | | |
|---|---|---|---|
| 3,354,129 | 11/1967 | Edmonds et al. | 528/388 |
| 3,519,598 | 7/1970 | Larsen | 260/45.75 |
| 3,531,434 | 9/1970 | Isaac | 260/45.75 |
| 3,708,454 | 1/1973 | Barlow et al. | 524/432 |
| 3,725,362 | 4/1973 | Walker | 528/373 |
| 3,919,177 | 11/1975 | Campbell | 528/373 |
| 4,215,035 | 7/1980 | Memering et al. | 260/45.75 W |
| 4,301,274 | 11/1981 | Campbell | 528/388 |
| 4,350,810 | 9/1982 | Tieszen et al. | 528/388 |
| 4,418,029 | 11/1983 | Reed et al. | 264/211 |
| 4,426,479 | 1/1984 | Deguchi et al. | 524/430 |
| 4,490,522 | 12/1984 | Kawabata et al. | 528/388 |
| 4,588,789 | 5/1986 | Scoggins et al. | 350/486 |
| 4,659,761 | 4/1987 | Leland et al. | 528/388 |

*Primary Examiner*—Veronica P. Hoke
*Attorney, Agent, or Firm*—Williams, Phillips & Umphlett

[57] ABSTRACT

Improved poly(arylene sulfide sulfone)s are prepared by contacting these polymers with a zinc source, optionally first with an alkali metal base, for a period of time sufficient to incorporate enough zinc cations to improve the melt stability of the polymers. The polymer can be subsequently cured to increase molecular weight.

41 Claims, No Drawings

MELT STABILIZATION OF POLY(ARYLENE SULFIDE SULFONE)S

FIELD OF THE INVENTION

The invention relates to a method for preparing poly(arylene sulfide sulfone)s. The invention also relates to fibers and other articles of manufacture prepared from these poly(arylene sulfide sulfone)s.

BACKGROUND OF THE INVENTION

Poly(arylene sulfide sulfone)s are engineering thermoplastics of potential commercial interest for film, fiber, molding, and composite applications because of their high melting points and heat resistance.

General processes for the production of poly(arylene sulfide sulfone)s are known. Poly(arylene sulfide sulfone)s can be prepared by the reaction of a polyhaloaromatic sulfone, such as bis(p-chlorophenyl)sulfone, with an alkali metal sulfide in a polar organic solvent.

However a major disadvantage has been that the poly(arylene sulfide sulfone)s are of relatively low melt stability and are not very processable. Further, the cured or processed polymers are of poor quality in that they appear black, brittle, outgassed, and of carbonaceous texture.

Poly(arylene sulfide)s, even containing small amounts of sulfone linkages (disclosed in U.S. Pat. No. 4,426,479), do not have the processing problems associated with poly(acrylene sulfide sulfone)s that have predominantly sulfone linkages. Poly(arylene sulfide)s do not carbonize during processing since they are able to be processed at much lower temperatures than poly(arylene sulfide sulfones) but yet are not as heat resistant as poly(arylene sulfide sulfones).

It would be most desirable to produce melt stable poly(arylene sulfide sulfone)s of good polymer quality that are capable of being processed and cured. Melt stable poly(arylene sulfide sulfone)s would provide improved processability, color, texture, flexibility, and toughness. In addition, melt stable poly(arylene sulfide sulfone)s should be able to be slowly cured, to increase the molecular weight, without destroying the quality of the polymer It is an object of our invention to provide a process for preparing melt stable poly(arylene sulfide sulfone)s. It is a further object of our invention to provide a process for preparing poly(arylene sulfide sulfone)s of good polymer quality. It is a further object of our invention to prepare poly(arylene sulfide sulfone)s of good polymer quality having a stable melt flow during processing.

SUMMARY OF THE INVENTION

We have discovered that melt stable poly(arylene sulfide sulfone)s are prepared by bringing together a poly(arylene sulfide sulfone), with a zinc source so as to incorporate zinc cations ($Zn^{++}$) into the polymer. The poly(arylene sulfide sulfone)s produced therefrom exhibit a more stable melt flow and more desirable polymer qualities when compared to poly(arylene sulfide sulfone)s which have not been contacted with zinc.

DETAILED DESCRIPTION OF THE INVENTION

We have discovered that melt stable poly(arylene sulfide sulfone)s are unexpectedly prepared by contacting a poly(arylene sulfide sulfone) with zinc cations ($Zn^{++}$). Any process whereby a zinc source contacts the poly(arylene sulfide sulfone) incorporating zinc cations therein to stabilize melt flow is envisioned to be within the scope of the present invention.

The polymers treated with zinc source according to the zinc treatment process of the present invention unexpectedly have such improved melt stability and processaability that they can be processed in conventional commercial applications.

According to our invention it is preferred that the zinc source, employed to contact zinc cations with the polymer, be zinc and zinc compounds selected from the group consisting of zinc metal, zinc oxide, and zinc salts.

In our invention there are three preferred methods of incorporating zinc cations into the polymer. These three methods generally include (a) adding a zinc source, preferably a soluble zinc compound, to the reactant mixture during polymerization, (b) washing the prepared polymer with a solution containing a zinc source, preferably a soluble zinc compound, and (c) melt mixing a zinc source, preferably a zinc compound, with the polymer at elevated temperatures.

Under the right conditions many different zinc sources can be used in any of the methods of incorporating zinc cations into the polymer, as long as zinc cations are present or are generated. For example, zinc metal (either zinc powder or zinc atoms from vapor deposition) could be melt mixed, according to method (c), with the polymer at elevated temperatures in the presence of oxygen to incorporate zinc cations into the polymer.

In our invention the most preferred zinc source that is melt mixed with the polymer is zinc oxide, due to its effectiveness and availability.

The incorporation of zinc cations into the polymer during polymerization, according to preferred method (a) is preferrably conducted at the end of polymerization under normal reaction conditions. The soluble zinc compound used in this method is preferably any zinc compound that when added to the polymerization reaction mixture is or becomes soluble in NMP and/or water.

In our invention, according to preferred methods (a) and (b), it is preferred that when the poly(arylene sulfide sulfone) is treated with a soluble zinc compound that the zinc compound be a water soluble zinc salt. It is even more preferred that the zinc salt be a zinc halide or a zinc carboxylate. The salts of zinc which are more preferred include zinc chloride, zinc fluoride, zinc bromide, zinc iodide, zinc acetate, and the like, and mixtures of any two or more thereof. The most preferred zinc salts, due to their effectiveness and availability, are zinc chloride, and zinc acetate.

In our invention, it is also possible that the zinc treatment process be a two-step process. Prior to contacting the polymer with a water soluble zinc compound, according to preferred step (b), it is possible to contact the polymer with a dilute effective proportion of a base such as an aqueous alkali metal base in order to neutralize acidic groups which may be present on the polymer. For example, an alkali metal carbonate or an alkali metal hydroxide aqueous solution having a pH of about 7.5 to about 14 can be employed. The alkali metal hydroxides are preferred and include sodium hydroxide (NaOH), lithium hydroxide, potassium hydroxide, rubidium hydroxide, and cesium hydroxide. The most preferred alkali metal base, due to its effectiveness and availability, is sodium hydroxide.

According to the present invention, the molecular weight of the polymer is indicated by its inherent viscosity. High inherent viscosity indicates that a polymer has a high molecular weight. The inherent viscosity is determined according to ASTM D 2857 at 30° C. in N-methyl-2-pyrrolidone for poly(arylene sulfide sulfone)s.

The preferred high molecular weight poly(arylene sulfide sulfone)s of the present invention will generally be expected to have an inherent viscosity of at least about 0.25 preferably at least about 0.35, and most preferably 0.4 to 0.8 deciliters per gram (dl/g).

The polymers of the present invention can also be cured. Polymers treated according to our invention are melt stable but yet can be cured in reasonable periods of time. The curing can be conducted at elevated temperatures for a suitable curing time. The polymers can be cured as a solid material below their melting point or as a polymer melt at temperatures above their melting point. Typically, temperatures employed are within the range of about 150° C. to 500° C. for about 5 minutes to 72 hours, more preferably at about 250° C. to 400° C. for about 15 minutes to 24 hours. The rate of cure depends upon the temperature; rate of cure is increased with increased temperature.

The polymers of the present invention can be cured at reduced or increased pressure; however, it is preferred that the polymers be cured at about atmospheric pressure under an oxidizing atmosphere such as air. It should be noted that caution should be exercised not to overly cure the polymers, since overly cured polymers are not able to be processed.

The melt stability of the polymers prepared according to our invention can be assessed by noting the change in the rate of melt flow of each polymer after being retained in a barrel of a melt index apparatus under ASTM D1238 conditions for a time ranging from about five minutes to about thirty minutes at an elevated temperature. That temperature is 343° C. for poly(phenylene sulfide sulfone).

The melt flow measurement at arbitrarily selected times is determined by extruding the molten polymer through the orifice in the barrel using a five kilogram driving weight. The time required to extrude a predetermined volume of polymer through the orifice is recorded and the weight of the cooled extrudate is measured. The melt flow is calculated in terms of grams of polymer extruded per 10 minutes of flow. If little or no change occurs in the melt flow of the polymer using hold periods of five minutes and thirty minutes, then it is apparent that a stable melt flow product is being tested. Generally, a melt flow decrease occurs indicated by a longer extrusion time required to extrude a predetermined amount of polymer from the barrel. However, in some instances, a melt flow increase occurs indicated by a shorter time required to extrude a predetermined amount of polymer from the barrel. For the purpose of this invention a change in the rate of polymer extrusion (melt flow) of more than about a ±50 percent from the five minute melt flow to the tne minute melt flow, is arbitrarily deemed to be not acceptable.

A melt stable polymer is prepared by contacting a poly(arylene sulfide sulfone) (PASS) with a zinc source at a temperature and pressure for a period of time sufficient to incorporate enough zinc cations to improve the melt stability of the polymer.

Generally, the polymers are contacted with the zinc source at a temperature of about 0° C. to 300° C. Preferably the polymers are contacted with the zinc source at a temperature of about 100° C. to 200° C., at a pressure of about 15 to 1500 psia, for a time ranging from about ½ minute to 3 hours.

When the polymer is contacted with the zinc source during polymerization the normal reaction conditions need not be varied.

The amount of the zinc source added to contact the polymer can vary depending upon the qualities desired in the final treated polymer. Generally the amount of zinc compound used to contact the polymer will be within the range of about 0.01 to 10 preferably about 0.25 to 2 weight percent based on the total weight of the polymer.

The time for contacting the polymers with the zinc source can vary widely, depending, in part, on the temperature and the nature of the polymers. The contacting time generally will be within a range of about 30 seconds to 3 hours, preferably from about 1 minute to 1 hour. When a soluble zinc compound is employed the pressure should be sufficient to maintain liquid phase conditions which can range from about 0 to 1,500 psia. Repeated treatments can be employed, if desired, and the process can be carried out in several stages, if desired.

When a soluble zinc source is used it is preferably a zinc salt. The concentration of the zinc salt preferably ranges from 0.001 weight percent up to the solubility limits of the particular salt employed. Preferably, the zinc salt in solution is in the range of about 0.1 to 5 weight percent.

The heating and contacting with the soluble zinc source can be carried out with conventional equipment. A convenient method for carrying out the process according to preferred method (b) is to contact the polymers and zinc salt in an enclosed tank provided with agitation. The contacting can be carried out in a single vessel or with a plurality of vessels. The polymers can be separated from the reaction product after contacting by suitable techniques including pressure reduction to atmospheric, filtration, and the like. The polymers are subsequently washed and/or dried for further use as desired.

When the zinc source is not contacted with the polymer in solution some of the contacting conditions will be quite different from solution contacting conditions.

When a zinc source is melt mixed with the polymer according to preferred method (c) the concentration of the zinc source is any amount sufficient to incorporate enough zinc cations into the polymer to improve the melt stability of the polymer. When the zinc source is zinc oxide this amount will preferably be within the range of about 0.1 to 5, more preferably about 0.2 to 1, and most preferred about 0.3 weight percent based on the total weight of the polymer composition.

Melt mixing the polymer with the zinc source is preferably conducting at ambient pressure at a high enough temperature for a period of time sufficient to melt the polymer and mix in the zinc source to incorporate zinc cations into the polymer. Melt mixing the polymer with the zinc source is preferably conducted at a temperature between about 330° C. and 370° C. for a period of time between about 3 seconds and 10 minutes. More preferably the period of time to melt mix the polymer with the zinc source is between about 3 and 10 seconds at the polymer's melting temperature.

A conventional method for melting mixing the zinc compound with the polymer can be carried out in an extruder such as a screw extruder as in an NRM extrusion system. Extrusion rates can vary over a wide range such as between high commercial rates of 500 to 1000 lb/hr to low rates of about 1 to 4 lb/hr. The polymer composition prepared therefrom can then be extruded or injected to form useful products or pelletized for later use.

PREPARATION OF PASS

PASS can be prepared by contacting a polyhaloaromatic sulfone and a sulfur source under polymerization conditions. One preferred process for preparing PASS involves contacting in a reaction mixture under polymerization conditions effective ratios of, a polyhaloaromatic sulfone, an alkali metal sulfide, and water in a polar organic medium.

When preparing PASS our process employs a polyhaloaromatic sulfone. Our process preferably employs a dihaloaromatic sulfone. Our process more preferably employs a dihaloaromatic sulfone of the formula:

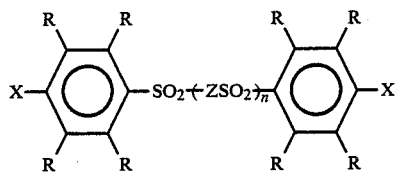

where each X is selected from the group consisting of fluorine, chlorine, bromine, and iodine; Z is a divalent radical selected from the group consisting of:

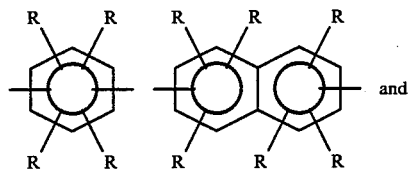

and

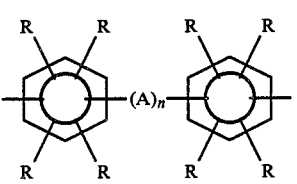

n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the dihaloromatic sulfone molecule being 0 to about 12. Preferably, each n is 0.

Bis(p-halophenyl)sulfones are presently preferred reactants in the process of our invention and can be represented by the formula

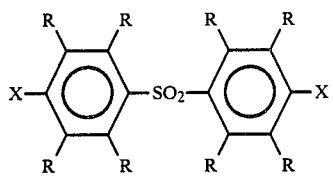

where X and R are defined as above and the total number of carbon atoms in each dihaloaromatic sulfone molecule being within the range of 12 to about 24.

Examples of some dihaloaromatic sulfones that can be employed in the process of our invention include bis(p-fluorophenyl)sulfone, bis(p-chlorophenyl)sulfone, bis(p-bromophenyl)sulfone, bis(p-iodophenyl)sulfone, p-chlorophenyl p-bromophenylsulfone, p-iodophenyl 3-methyl-4-fluorophenyl sulfone, bis(2-methyl-4-chlorophenyl)sulfone, bis(2,5-diethyl-4-bromophenyl)sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl]ether, bis[p-(p-chlorophenylsulfonyl)phenyl]sulfide, bis[p-(p-chlorophenylsulfonyl)phenyl]sulfone, bis[p-(p-bromophenylsulfonyl)phenyl]methane, 5,5-bis[3-ethyl-4-(p-chlorophenylsulfonyl)phenyl]nonane, and the like, and mixtures thereof.

The presently preferred dihaloaromatic sulfone, due to its effectiveness and commercial availability, is bis(p-chlorophenyl)sulfone.

The more preferred process of preparing PASS is by the reaction of a dihaloaromatic sulfone, such as bis(p-chlorophenyl)sulfone, with an alkali metal sulfide prepared from an alkali metal hydrosulfide, such as sodium hydrosulfide, and an alkali metal hydroxide, such as sodium hydroxide, and water, in a polar organic solvent, such as an organic amide like N-methyl-2-pyrrolidone (NMP), forming repeating units of phenylene sulfide sulfone and is represented by the following formula:

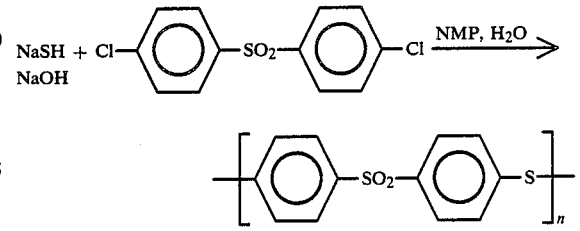

The presently preferred PASS, due to its effectiveness and commercial availability, is poly(phenylene sulfide sulfone) (PPSS).

The alkali metal hydrosulfides for our invention include lithium hydrosulfide, sodium hydrosulfide, potassium hydrosulfide, rubidium hydrosulfide, cesium hydrosulfide, and mixtures thereof.

The preferred alkali metal hydrosulfide, due to its effectiveness and availability, is sodium hydrogen sulfide (NaSH). The preferred alkali metal hydroxide, due to its effectiveness and availability, is sodium hydroxide (NaOH).

The solvents which can be useful in preparing the polymers of our invention are polar organic solvents. Such polar organic solvents include amides and sulfones.

The polar organic solvents used in preparing the polymers in this invention should be substantially liquid at the reaction temperatures and pressures employed. The polar organic solvents can be cyclic or acyclic and can have 1 to about 18 carbon atoms per molecule.

Specific examples of such polar organic solvents include 1,3-dimethyl-2-imidazolidonone, formamide, acetamide, hexamethylphosphoramide, tetramethylurea, N,N'-ethylene-2-pyrrolidone, N-methyl-2-pyrrolidone (NMP), 2-pyrrolidone, ε-caprolactam, N-ethylcaprolactam, sulfolane, N,N'-dimethylacetamide, diphenylsulfone, and the like, and mixtures thereof. The preferred polar organic solvent due to its effectiveness and commercial availability, is NMP.

Although the molar excess of water to alkali metal hydrosulfide present in the reaction mixture can vary somewhat, generally it will be within a molar ratio of about 2:1 to 30:1.

In addition to the incorporation of zinc cations from a zinc source, other ingredients normally employed can also be incorporated up to major amounts including extenders, fillers, pigments, plasticizers, stabilizers, etc. Among the fillers which can be employed are, for instance, carbon blacks, calcium carbonate, finely divided silica, calcium silicate, alumina, etc. Good results are obtained as far as physical properties are concerned even in the absence of additional ingredients.

In some applications additional strength is desirable. Polymer strength can be increased by incorporating strengtheners such as fibers into the polymer. The preferred strengtheners, due to their effectiveness, are inorganic fibers such as asbestos, glass, and carbon.

It is most preferred that the poly(arylene sulfide sulfone)s be homopolymers and be the only polymer when used in product applications. It is possible, however, but less preferred, to copolymerize the dihaloaromatic sulfone monomer with minor amounts of other monomers or to mix the poly(arylene sulfide sulfone)s with minor amounts of other polymers.

Copolymers containing less than about 50% arylene sulfide sulfone repeating units or polymer blends containing minor amounts of poly(arylene sulfide sulfone) would have lower required processing temperatures, thereby lessening the effects of poor melt stability making these polymers or blends more processable. These compolymers or blends would not have the melt stability problems of poly(arylene sulfide sulfone). These copolymers or blends would, nevertheless, be undesirable because they would be sacrificing high melting points and heat resistance for increased processability.

EXAMPLES

Examples provided are intended to assist in a further understanding of our invention. Particular materials employed, species and conditions are intended to be further illustrative of our invention and not limitative of the reasonable scope thereof.

Example I

Part A—PPSS Preparation

A 2-gallon autoclave equipped with temperature and pressure measuring means, stirring means, external heating means and internal cooling coils was charged with 1,160.2 g (4.04 g-mole) bis(4-chlorophenyl)sulfone, 424 g (4.00 g-mole) sodium carbonate, 328 g (4.00 g-mole) sodium acetate, 380.2 g (4.00 g-mole) sodium hydrosulfide (charged as an aqueous solution of 58.977 wt. % NaSH), 1,587.5 g (16.00 g-mole) N-methyl-2-pyrrolidone (NMP), and 108 g (6.00 g-mole) deionized water. The mixture was heated from 26° C. to 200° C. over a period of about one hour while stirring at 600 rpm and maintained at 200° C. for three hours. A mixture of 1200 ml NMP and 200 ml deionized water was then pumped into the reactor over a period of about 2 hours (typically requires only about 15 minutes) during which the pressure increased from 255 psig to 300 psig while the temperature decreased to 180° C. The 2 hour pumping period was caused by mechanical difficulties with the pump. Stirring at 600 rpm was maintained throughout this period and until about 150° was reached. Subsequent slow cooling overnight to ambient temperature was done in the absence of stirring. The reaction mixture was removed from the reactor as a solid particulate material comprising PPSS and imbibed liquids. The solid material was washed with hot (about 90° C., about 4L) deionized water, filtered, and rinsed once on the filter. This process was repeated twice more and then a final wash with cold deionized water concluded the procedure to remove water soluble impurities. The recovered PPSS had a flow rate of 3.97 g/10 minutes determined at 343° C. using a 5 kg weight and 0.0825±0.002 inch diameter/0.315±0.001 inch long orifice according to the procedures of SSTM D1238, Procedure B.

Part B—Zinc Acetate Treatment

A one liter autoclave was charged with 40 g of the PPSS polymer prepared and recovered as described above, 400 g deionized water and 4.0 g zinc acetate [$Zn(C_2H_3O_2)_2 \cdot 2H_2O$]. The autoclave was equipped with stirring means, heating/cooling means and means for measuring temperature and pressure. The PPSS/aqueous zinc acetate mixture was heated to 185° C. with stirring and held for one hour at the temperature with continued stirring. The mixture was then cooled to ambient temperature and the recovered polymer washed once in hot water (about 90° C., about 400 mL) with stirring. The recovered polymer was then dried under vacuum at 160° C.

A control run was carried out by treating 40 g of the same PPSS employed above in the same manner except that no zinc acetate was added to the 400 g of water used in the treatment.

Melt stability of the zinc acetate treated PPSS and the control run PPSS was determined by measuring weights of extruded PPSS obtained at 1 minute intervals from an extrusion plastometer at 343° C. under a 5 kg weight with the same orifice used to determine melt flow.

In these tests, one minute extrudate samples were taken after 6 minutes of holding the polymer in the extrusion plastometer had elapsed and continued through the eleventh or twelfth minute. The one minute extrudate samples were weighed and the results obtained are shown in the table below.

TABLE I

| | Extruded PPSS wt. in One Minute, g | |
|---|---|---|
| After Minutes @ 343° C. | Zinc Acetate Treated | Control Run |
| 6 | 0.91 | 0.75 |
| 7 | 0.91 | 0.72 |
| 8 | 0.87 | 0.66 |
| 9 | 0.83 | 0.63 |
| 10 | 0.82 | 0.59 |
| 11 | 0.82[a] | 0.53[b] |
| 12 | —[c] | 0.47 |

[a]Represents a 90% retention of the flow value taken at 6 minutes.
[b]Represents a 71% retention of the flow value taken at 6 minutes.
[c]No measurement made.

It can be observed that even at the 6 minute hold mark in the above tests the control polymer already had a reduced flow weight compared with the zinc acetate treated polymer.

The above results demonstrate that zinc acetate treatment significantly improved the melt stability of PPSS as measured by extrudate weight of the melt held at 343° C. for a period of time.

In addition to improving the melt stability of the PPSS, treatment of PPSS according to the present invention results in an improvement in color, texture, curability, moldability, and odor and a reduction in voids.

Example II

The following example is a comparison example showing the effect of aqueous zinc treatment on a different polymer.

Part A—Poly(Phenylene Sulfide Ketone) Preparation

In this section the preparation of a control poly(phenylene sulfide ketone) (PPSK) is described.

To a two gallon stainless steel reactor fitted with an anchor stirrer and nitrogen inlet tube were charged: 2.00 moles of sodium hydrogen sulfide solution (190.8 grams of NaSH in solution), 2.01 moles of sodium hydroxide pellets (80.04 grams of NaOH pellets provided by Mallinckrodt, Inc., St. Louis, Mo), 2.005 moles of 4,4'-dichlorobenzophenone (503.5 grams of DCBP provided by Ihara Chemical Industry Company, Tokyo, Japan), 24.84 moles of N-methyl-2-pyrrolidone (2400 ml of NMP provided by BASF) and 6 moles of deionized water (108 ml of water).

The reactor was sealed and flushed several times with 100 psig $N_2$ and then vented to remove air while the reactor mixture was stirred at room temperature. The reactor mixture was then heated to a temperature of about 250° C. This temperature was maintained for about 3 hours while a pressure of about 200 psig was established. The reactor temperature and pressure were then raised during ½ hr. to about 300° C. and 400 psi and held for about 15 minutes. The reactor was quenched with 475 ml of deionized water and cooled over night to room temperature. Following filtration, the polymer was given 4 hot deionized water washes and 4 cold deionized water washes and dried in an electric oven.

Part B—Washing PPSK

This section illustrates the effect of different washes on the melt stability of PPSK.

The PPSK recovered above was charged to a reactor with 30 grams NaOH, and 30 ml deionized water. The temperature was raised to 125° C., cooled, and the polymer was then filtered and washed with cold deionized water. The resulting polymer was divided into two equal halves. The first half was charged to a reactor with 75 grams calcium acetate, and 300 ml of deionized water. This reactor was heated to 185° C. and held for 30 minutes. The reactor was then cooled and the polymer was filtered and washed with cold deionized water until the filtrate was clear.

The second half of the PPSK washed as above was charged to a reactor with 75 grams zinc acetate and 300 ml of deionized water. The reactor was heated to 185° C. and held for 30 minutes. The reactor was cooled and the polymer was filtered and washed with cold deionized water until the filtrate was clear.

The melt stability of PPSK is summarized in Table II.

TABLE II

| | PPSK Flow Rates from Melt Indexer[a] | |
|---|---|---|
| Treatment | Hold Time/Flow Rates[b] | |
| (Wash) | 5 Min Hold | 15 Min Hold |
| None[c] | 88.70 | 13.33 |
| NaOH/calcium acetate | 96.94 | 35.15 |
| NaOH/zinc acetate | 72.02 | 11.7[d] |

[a]Melt indexer at 371° C.
[b]Flow rates g/10 min
[c]A polymer prepared according to the general process in Example II, Part A above without treatment
[d]The polymer was gassy and of poor quality The results above in Table II indicate that PPSK polymers which are washed with zinc acetate according to the present invention do not show an improvement in melt stability, when compared to PPSK which has not been washed with zinc acetate.

Example III

PPSS Preparation in the presence of Zinc Acetate

The PPSS for this example was prepared almost as above in Part A of Example I, except that zinc acetate was added at the end of polymerization.

A 1 liter autoclave equipped with temperature and pressure measuring means, stirring means, external heating means and internal cooling coils was charged with 143.03 g (0.505 g-mole) bis(4-chloro-phenyl)sulfone, 20 g (0.5 g-mole) sodium hydroxide, 41 g (0.5 g-mole) sodium acetate, 47.7 g (0.5 g-mole) sodium hydrosulfide (charged as an aqueous solution of 58.977 wt. % NaSH), 198.3 g (2.00 g-mole) N-methyl-2-pyrrolidone (NMP recycle), and 13.5 g (0.75 g-mole) deionized water. The mixture was heated from 20° C. to 200° C. and increased in pressure from 10 psig to 70 psig over a period of about one hour while stirring at 600 rpm and maintained at 200° C. and 70 psig for three hours: A mixture of 5 g zinc acetate and 50 g NMP was added to the reactor while increasing to 80 psig and held for 0.5 hr. A mixture of 125 g NMP and 50 g deionized water was then pumped into the reactor over a period of about 20 minutes during which the pressure increased from 80 psig to 160 psig. Stirring at 600 rpm was maintained throughout this period. Subsequent slow cooling overnight to ambient temperature was done in the absence of stirring. The reaction mixture was removed from the reactor as a solid particulate material comprising PPSS and imbibed liquids. The solid material was washed with hot stirred water, recovered and dried at 160° C. for 20 hr. The recovered PPSS had no odor and had a melt flow at 309.36 sec hold of 4.04 g/10 minutes determined at 343° C. using a 5 kg weight and 0.0825±0.002 inch diameter/0.315±0.001 inch long orifice according to the procedures of ASTM D1238, Procedure B.

In these tests, two minute extrudate samples were taken after 5 minutes of holding the polymer in the extrusion plastometer had elapsed and continued through the twenty first minute cut. The two minute extrudate samples were weighed and the results obtained are shown in the table below.

TABLE III

| Extruded PPSS wt. in Two Minutes, g | |
|---|---|
| After Minutes @ 343° C. | Zinc Acetate Added During Polymerization |
| 7 | 0.93 |
| 9 | 0.88 |
| 11 | 0.86 |
| 13 | 0.80 |
| 15 | 0.76 |
| 17 | 0.74[a] |
| 19 | 0.71 |
| 21 | 0.67[b] |

[a]Represents an 86% retention of the flow value between the 7 minute and the 17 minute cuts.
[b]The last cut still had excellent color.

It can be observed that even at the first two minute cut in the above test the zinc acetate treated polymer already had a stable flow weight compared with the control polymer in Table I above.

The above results demonstrate that zinc acetate added during polymerization significantly improved the melt stability of PPSS as measured by extrudate weights of the melt held at 343° C. for a period of time.

In addition to improving the melt stability of the PPSS treatment of PPSS according to the present invention results in an improvement in color, texture, curability, moldability, and odor and a reduction of voids.

Example IV

A PPSS polymer was prepared according to the general procedure as in Part A of Example I. The polymer was vacuum dried at 180° C. for 48–72 hours to remove residual NMP. The polymer was then pelletized with a 1" NRM extruder using a standard 3:1 compression ratio screw. The invention run had 0.3% zinc oxide (ZnO) added to the extruder.

TABLE IV

| Extruded PPSS wt. in One Minute, g | | | |
|---|---|---|---|
| After Minutes @ 343° C. | ZnO added (Pellets) | Control (Pellets) | Control (Powder) |
| 6 | 1.51 | 1.25 | 1.52 |
| 7 | 1.56 | 1.2 | 1.35 |
| 8 | 1.5 | 1.08 | 1.22 |
| 9 | 1.45 | 0.99 | 1.04 |
| 10 | 1.42 | 0.88 | 1.04[c] |
| 11 | 1.39[a] | 0.79[b] | —[d] |

[a]Represents a 92% retention of the flow value taken at 6 minutes.
[b]Represents a 63% retention of the flow value taken at 6 minutes.
[c]Represents a 68% retention of the flow value taken at 5 minutes.
[d]No measurement made.

The above results demonstrate that ZnO added during extrusion significantly improved the melt stability of PPSS as measured by extrudate weights of the melt held at 343° C. for a period of time.

In addition to improving the melt stability of the PPSS the pellets with ZnO compound in were lighter in color and showed no color change between the first and the last pellets made. The unstabilized pellets were noticeably darker.

Zinc stabilization also improved the processability of the polymer. Injection molded test bars were made from stabilized and unstabilized PPSS and the zinc stabilized PPSS had improved mechanical properties.

That which is claimed is:

1. A method for preparing a melt stabilized polymer comprising:
   contacting a poly(arylene sulfide sulfone)-homopolymer with a zinc source at a concentration, temperature, and pressure for a period of time sufficient to incorporate enough zinc cations into said poly(arylene sulfide sulfone)homopolymer to improve the melt stability of said poly(arylene sulfide sulfone)homopolymer.

2. The method according to claim 1 wherein said poly(arylene sulfide sulfone) is cured ater the incorporation of said zinc cations.

3. The method according to claim 1 wherein said temperature and pressure at which said poly(arylene sulfide sulfone) and said zinc source are contacted ranges from about 0° C. to 300° C. and about 15 to 1500 psia for a period of time ranging from about ½ minute to 3 hours.

4. The method according to claim 1 wherein said poly(arylene sulfide sulfone) is poly(phenylene sulfide sulfone) represented by repeating units of the structural formula:

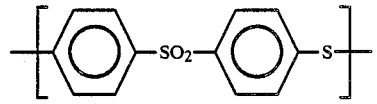

5. The method according to claim 1 wherein said zinc source is selected from the group consisting of zinc metal, zinc oxide, and zinc salts and is contacted in an amount in the range of about 0.01 to 10 weight percent based on the total weight of said zinc source and said poly(arylene sulfide sulfone).

6. The method according to claim 5, wherein said zinc salts are zinc carboxylates.

7. The method according to claim 6 wherein said zinc carboxylate is zinc acetate.

8. The method according to claim 5 wherein said zinc salts are zinc halides.

9. The method according to claim 8, wherein said zinc halide is zinc chloride.

10. A method for preparing a polymer comprising:
    (a) contacting in a polar organic solvent a polyhaloaromatic sulfone monomer and an alkali metal sulfide under polymerization conditions effective for producing a polymer;
    (b) recovering said polymer, and
    (c) contacting the recovered polymer with a zinc source at a temperature and pressure for a period of time sufficient to incorporate zinc cations into said polymer to improve the melt stability of said polymer.

11. The method according to claim 10, wherein water is also present in said polar organic solvent of (a) in the molar ratio of about 2:1 to 12:1 water with respect to the alkali metal sulfide.

12. The method according to claim 10, wherein said polymer is cured after being contacted with said zinc source.

13. The method according to claim 10, wherein said temperature and pressure at which said polymer and said zinc source are brought together ranges from about 0° C. to 300° C. and about 15 psia to 1500 psia for a period of time ranging from about ½ minute to 3 hours.

14. The method according to claim 10, wherein said recovered polymer of (b) is treated with a dilute aqueous alkali metal base prior to contacting said polymer with said zinc source of step (c).

15. The method according to claim 10, wherein said zinc source is a zinc salt in an aqueous solution.

16. The method according to claim 10, wherein said zinc source is zinc oxide and is contacted with said polymer by melt mixing.

17. The method according to claim 16 wherein said melt mixing is conducted in an extruder at about 330° C. to 370° C. and about ambient pressure for a period of time ranging from about 3 sec. to 10 sec.

18. The method according to claim 16 wherein about 0.2 to 1 weight percent zinc oxide, based on the total weight, is melt mixed with said polymer.

19. The method according to claim 10, wherein said zinc source is added as zinc salt selected from the group consisting of zinc halides and zinc carboxylates.

20. The method according to claim 19, wherein said zinc salt is selected from the group consisting of zinc acetate and zinc chloride.

21. The method according to claim 14, wherein said alkali metal base is an alkali metal hydroxide.

22. The method according to claim 21, wherein said alkali metal hydroxide is sodium hydroxide.

23. The method according to claim 10, wherein said polyhaloaromatic sulfone is a dihaloaromatic sulfone and said polar organic solvent is an organic amide.

24. The method according to claim 23, wherein said dihaloaromatic sulfone is bis(p-chlorophenyl)sulfone and said organic amide comprises N-methyl-2-pyrrolidone.

25. The method according to claim 10, wherein said alkali metal sulfide is prepared from an alkali metal hydrosulfide and an alkali metal base employing a molar ratio of about 1:1 alkali metal hydrosulfide to alkali metal base, the molar ratio of water with respect to the alkali metal hydrosulfide is in the range of about 2:1 to 30:1 and the monomer employing a molar ratio of about 0.95:1 to 1.05:1 with respect to the alkali metal hydrosulfide.

26. The method according to claim 25, wherein said alkali metal base is selected from the group consisting of alkali metal hydroxides and alkali metal carbonates.

27. The method according to claim 10, wherein said polymer is a poly(arylene sulfide sulfone) and is poly(phenylene sulfide sulfone) represented by repeating units of the structural formula:

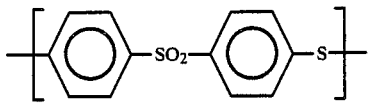

28. A method for preparing a polymer comprising: contacting in a polar organic solvent a polyhaloaromatic sulfone monomer, an alkali metal sulfide, and a soluble zinc source under polymerization conditions effective for producing a polymer; and recovering said polymer;
wherein said polymerization conditions are sufficient to incorporate zinc cations from said zinc source into said polymer to improve the melt stability of said polymer.

29. The method according to claim 28, wherein said zinc source is added at the end polymerization.

30. The method according to claim 28, wherein said zinc source is a soluble zinc salt.

31. The method according to claim 30, wherein said zinc salt is selected from zinc carboxylates and zinc halides.

32. The method according to claim 31, wherein said zinc salt is selected from the group consisting of zinc acetate and zinc chloride.

33. The method according to claim 28, wherein said polymer is a poly(arylene sulfide sulfone) and is poly(phenylene sulfide sulfone) represented by repeating units of the structural formula:

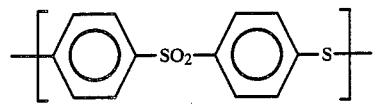

34. A melt stable polymer composition comprising poly(arylene sulfide sulfone) homopolymer and a melt stabilizing amount of zinc cations.

35. The composition according to claim 34, wherein said composition also contains inorganic fibers selected from the group consisting of asbestos, glass, and carbon.

36. A fiber produced from the polymer composition of claim 34.

37. A film produced from the polymer of claim 34.

38. The composition according to claim 34, wherein said poly(arylene sulfide sulfone) and said zinc cations of said polymer composition are present in the range of about 90 to 99.99 weight percent and about 0.01 to 10 weight percent respectively.

39. The composition according to claim 38, wherein said poly(arlyene sulfide sulfone) is poly(phenylene sulfide sulfone) represented by repeating units of the structural formula:

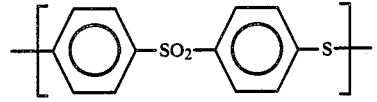

40. The composition according to claim 38, wherein said polymer composition has been cured.

41. The composition according to claim 34, wherein said polymer composition is combined with at least one additional component selected from the group consisting of pigments, fillers, extenders, plasticizers, and stabilizers.

* * * * *